March 31, 1959 M. S. POSTMAN 2,880,410

ANALOG TO DIGITAL TRANSDUCER

Filed Oct. 5, 1954 3 Sheets-Sheet 1

INVENTOR.
MARTIN S. POSTMAN
BY George Sifkin
B. L. Zangwill
ATTORNEYS

March 31, 1959 M. S. POSTMAN 2,880,410

ANALOG TO DIGITAL TRANSDUCER

Filed Oct. 5, 1954 3 Sheets-Sheet 2

INVENTOR.
MARTIN S. POSTMAN
BY George Sipkin
B. L. Zangwill
ATTORNEYS

March 31, 1959 M. S. POSTMAN 2,880,410

ANALOG TO DIGITAL TRANSDUCER

Filed Oct. 5, 1954 3 Sheets-Sheet 3

INVENTOR.
MARTIN S. POSTMAN
BY George Sipkin
B. L. Zangwill
ATTORNEYS 2,880,410

ANALOG TO DIGITAL TRANSDUCER

Martin S. Postman, Washington, D.C.

Application October 5, 1954, Serial No. 460,523
9 Claims. (Cl. 340—347)
(Granted under Title 35, U. S. Code (1952), sec. 266)

The invention described herein may be manufactured and used by or for the Government of the United States of America for governmental purposes without the payment of any royalties thereon or therefor.

The invention relates to an improved transducer mechanism of the type used to translate the mechanical rotation of a shaft into an electrical representation in terms of a binary digital code. Basically, the transducer involves a switch or commutator driven by an input shaft and designed to set up a binary pattern of energization on a plurality of output leads of the switch. The input shaft rotation is divided into a finite number of steps each one of which is represented by a different pattern of energization applied to the output leads. In other words the transducer is a commutating switch arrangement between a source of power and the binary output leads.

Transducer devices of the type generally described above are well known in the prior art. They have been applied in various systems wherein information in terms of a shaft rotation must be transformed into a binary code representation. A difficulty experienced with prior art systems has been due to practical problems involved in their construction. The transducers are generally built up as two relatively rotatable elements one being a commutator plate or drum and the other set of brushes cooperating therewith. Due to the fact that a brush must possess a finite thickness, it will of necessity overlap and make contact with two sectors of the commutator plate or drum while transferring from one to another of the sectors. This results in a false voltage pattern being set upon the output leads indicating a position which is not the true position of the input shaft. The output is therefor subject to ambiguity.

It is an object of the present invention to provide an improved transducer device which is not subject to position ambiguity.

It is a further object of the present invention to provide a transducer device which prevents brush width from causing false voltage patterns on the output leads.

It is a still further object of the invention to simplify the transducer structure while increasing the reliability of the results derived therefrom.

Other objects and many of the attendant advantages of this invention will be readily appreciated as the same become better understood by reference to the following detailed description when considered in connection with the accompanying drawings wherein.

Figures 1, 3, 4:
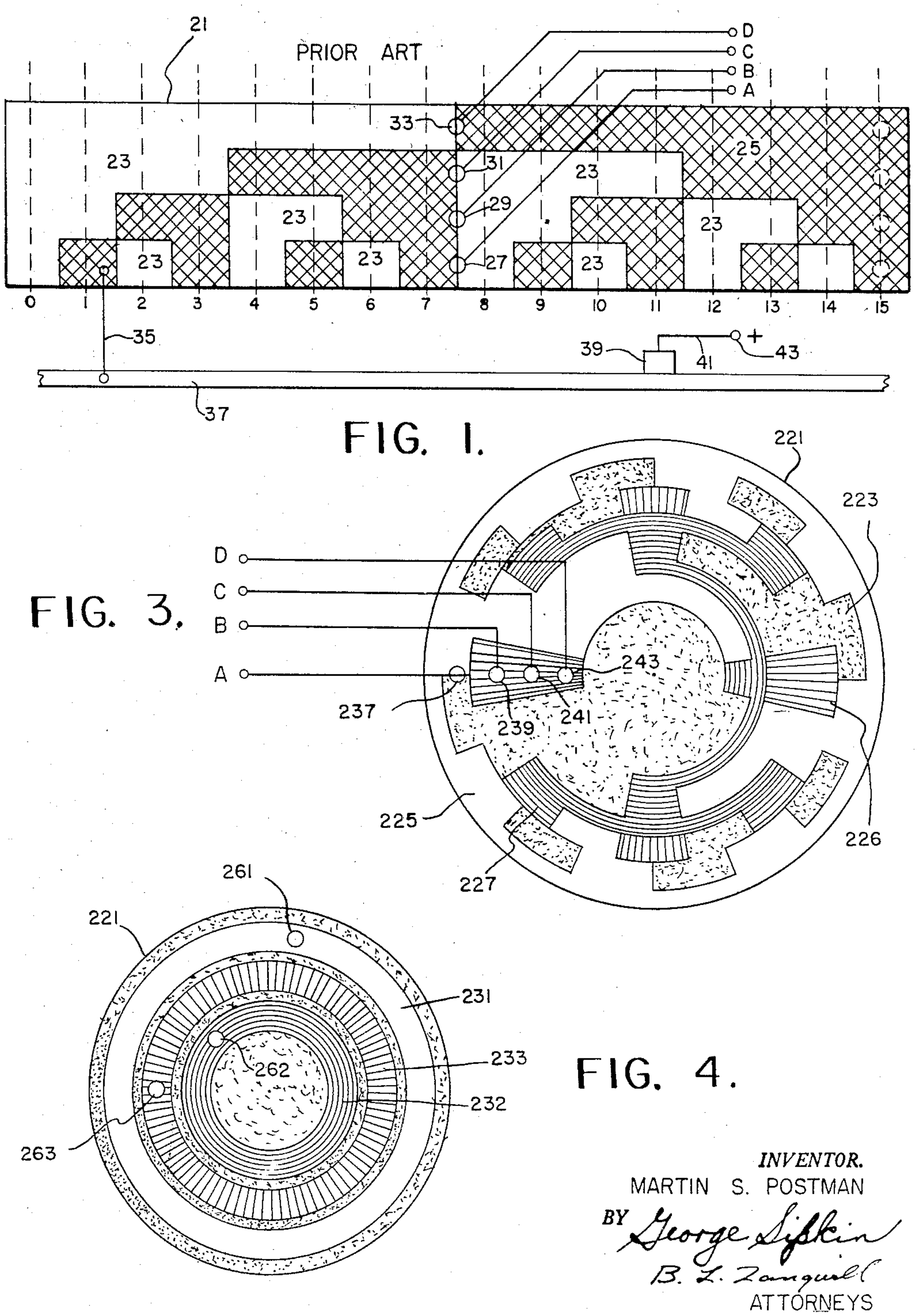
Figure 1 is a developed schematic view illustrating a drum type transducer system constructed in accordance with the practice of the prior art.
Figure 3 is a front elevation view of a disc type of commutator representing a modification of the invention.
Figure 4 is a rear elevation view of the disc shown in Figure 3.

The system of Figure 1 is a prior art transducer device system used to convert shaft rotation to digital code output. The transducer itself consists of a rotating drum type commutator element 21 whose surface is shown in developed form. The face of the drum is made up of segments 23 of electrical insulating material and other segments 25 of electrical conducting material. It will be noted that all of the conducting segments 25 are electrically connected to one another.

Four brushes 27, 29, 31 and 33 bear upon the surface of the drum type commutator 21. These brushes are maintained in a fixed position by structure not shown and the commutator rotates with respect thereto. The brushes 27, 29, 31 and 33 are connected respectively to output terminals A, B, C and D.

The conducting segments 25, as previously indicated, are all electrically connected together and are further connected through a lead 35 to a slip ring 37 mounted upon the same shaft as the commutator. The slip ring is also shown as a developed surface in Figure 1. A brush 39 bearing upon the slip ring surface is connected by a lead 41 to a terminal 43 which is one terminal of an electric power source.

Various positions of the commutator with respect to the brushes are indicated by the dotted lines designated by the station numbers 0 through 15 inclusive. It will be apparent that as each station on the commutator is placed beneath the brushes a corresponding pattern of energization will be set upon the output terminals A through D. For example, in position 3 the terminals A and B will be energized and terminals C and D de-energized. This is the binary code representation of station 3 of the commutator.

The commutator system of Figure 1 is however subject to a defect. The brushes have been shown in the drawing located midway between stations 7 and 8 of the commutator. In a practical structure the brushes 27, 29, 31 and 33 have a finite width. In passing from one station to another they therefore bridge the dividing line between stations as shown in the position illustrated. In this position, it becomes apparent that all of the output terminals A through D are energized. This condition of the output terminals is that representative of station 15. Other errors similarly occur at the midpoint between stations 5 and 6, thereby setting up the voltage pattern properly representing station 7. The midpoint between stations 3 and 4 also gives an indication representative of station 7. The system is thus capable of false or ambiguous voltage or code patterns.

Some of the ambiguities can be removed by the adoption of a commutator pattern called a cyclic which only changes one digit between adjacent positions or stations. This code arrangement has, however, certain other disadvantages.

Figure 2:
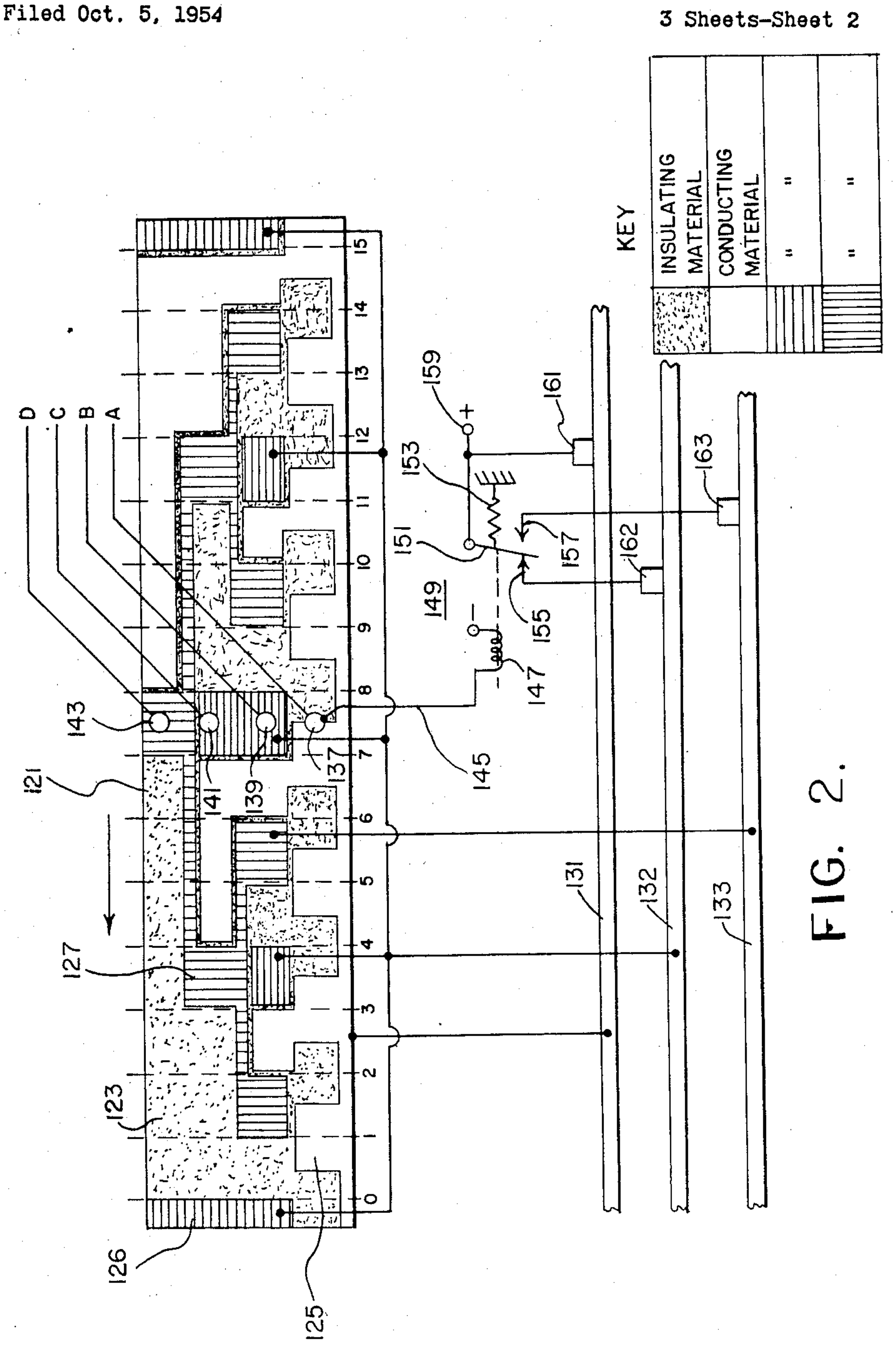
Figure 2 is developed view, constructed in a similar manner showing a drum type transducer system constructed in accordance with the principles of the present invention.

The present invention relates to a transducer utilizing an improved method of eliminating ambiguity. One form of apparatus for practicing the improved method is shown in Figure 2 of the drawings. This figure illustrates the improved commutator laid out in a developed view similar to that of Figure 1.

The system of Figure 2 comprises a drum commutator 121 corresponding to the commutator of Figure 1. The surface of the drum commutator includes segments 123 of insulating material as shown by the strippled sections. The remaining surface portion of the drum is made up of segments of electrically conductive material. In order to make the drawing convey information as to the operation and structure of the system, a convention has been adopted to enable rapid comprehension of the system. A key at the lower right edge of the figure is used to explain and indicate the meaning of the convention adopted. The first group of conducting segments 125 have been indicated with a white surface. All of these segments 125 are electrically connected with one another and with a first slip ring 131. A second group of auxiliary conducting segments or change or switching segments 126, shown with a horizontally hatched surface, are all electrically interconnected and connected in turn to a second slip ring 132. A third group of auxiliary conducting segments or change or switching segments 127, shown with a vertically hatched surface, also are all electrically connected with one another and with a third slip ring 133. The commutator 121 has sixteen positions indicated by the dotted lines and numbered from 0 to 15 inclusive.

Four major digit brushes 137, 139, 141 and 143 are held in a fixed position by supporting structure not shown and the commutator drum 121 rotates with respect thereto. The slip rings 131, 132 and 133 are carried by a shaft 134 which also carries the comutator drum 121. The four major brushes 137, 139, 141 and 143 are connected respectively to output terminals A, B, C and D which correspond to the output terminals given the same designation in Figure 1. Brush 137 which acts as a minor brush for the minor digits of a code is also connected through lead 145 to coil 147 which operates an armature 151 biased by a spring 153, and cooperating with a normally open contact 155 and a normally closed contact 157. The armature 151 is connected to a terminal 159 which is adapted for connection, as indicated, to one terminal of a source of current indicated herein as the positive terminal. The terminal 159 is also connected to a brush 161 bearing upon the slip ring 131. The normally open contact 155 is connected to a similar brush 162 bearing upon slip ring 132, and the normally closed contact 157 is connected to a brush 163 bearing upon the slip ring 133.

The essential difference in the system of Figure 2 over the prior art as represented by Figure 1 lies in the make up of the commutator surface and the relay operated switching circuit for energizing the various commutator segments. The mode of operation of the system of Figure 2, which will now be described, distinctly points out and makes clear these differences.

This mode of operation employs change segments 126 and 127 inserted in each position where a major brush will pass from a conducting to a non-conducting segment or vice versa as shown in Fig. 2. The minor brush 137 in passing from a conducting to a non-conducting segment causes each major brush which is to change its condition to move onto a change segment which is in the same condition as the segment which that brush has just left.

It will be apparent from inspection of Figure 2 that the conductive segments 125, shown with a white surface, are energized at all times through the slip ring 131 and its associated brush 161. The conductive change segments 126, shown with horizontal hatching, and the conductive change segments 127, shown with vertical hatching, are alternately energized under the control of the relay 149. Relay 149 in turn is controlled by the energization of the lower brush 137 bearing upon the commutator or control segments. Brush 137 is alternately energized and de-energized at succeeding stations on the face of the commuator changing from one state to another at points midway between stations.

The arrangement of conductive commutator segments and their relay controlled energizing circuits is such that the false output indications or ambiguities of the prior art are eliminated. In Figure 2, the brushes have been shown located midway between stations 7 and 8 as in the prior art device of Figure 1. It will be remembered that at this position in Figure 1, all of the brushes were energized giving a false indication of station 15. Assuming the commutator surface to be moving from right to left as indicated by the arrow in Figure 2, the position of station 7 is such that the lower three brushes 137, 139 and 141 are energized. The relay coil 147 connected to brush 137 is energized and the relay armature is in its attracted position as shown. Under these circumstances the horizontally hatched commutator change or switching segments 126 are energized through the relay armature 151, contact 155, brush 162 and slip ring 132. The vertically hatched change or switching segments 127 are de-energized because of the open circuit at contact 157. The output terminals A, B and C are energized which is the correct condition for station 7. This condition prevails as the commutator surface moves with respect to the brushes. At a point slightly more than halfway from station 7 toward station 8 the brush 137 leaves the conducting segment 125 and becomes de-energized. This causes relay 149 to drop out and deenergize the horizontally hatched commutator segments 126. The drop out of the relay energizes the vertically hatched switching segments 127 through relay armature 151, contact 157, brush 163 and slip ring 133. Brush 143 and output terminal D are thus energized which is the proper code indication for station 8.

It will be noted that the change from the code of station 7 to the code of station 8 has been achieved without any false indication during the changeover interval. A similar analysis of the progress of the commutator through the remaining positions will show that this changeover, without faulty indication, is characteristic over the entire range of the system.

As a practical matter commutators of the type disclosed herein may be built in the form of a disc rather than that of a drum. Figure 3 illustrates a front elevation view of such a commutator constructed in accordance with the invention. Figure 4 is a rear elevation of this same commutator. The same conventions used to illustrate the different groups of commutator segments used in Figure 2 has been applied to the commutator segments of Figure 3. The slip rings shown in Figure 4 also have been hatched in the same manner.

Figure 3 illustrates a disc commutator 221 formed of insulating material. The commutator also has a first group of conductive segments 225, shown with a white surface; a second group of conductive segments 226, shown with a radially hatched surface and a third group of conductive segments 227 shown with a circumferentially hatched surface. Four brushes have been indicated at 237, 239, 241 and 243 which correspond to brushes 137, 139, 141 and 143 respectively of Figure 2.

Figure 4 illustrates the rear surface of the disc commutator 221 and shows slip rings 231, 232 and 233 which are shown hatched in the same manner as the particular group of segments to which they are electrically connected. The connections are made internally of the commutator structure and are not visible in Figures 3 and 4. Slip ring 231 has a brush 261 thereon and slip rings 232 and 233 have brushes 262 and 263 respectively thereon. The external connections made to the commutator of Figures 3 and 4 are the same as those of the system shown in Figure 2.

The commutator devices of Figures 2, 3 and 4 illustrate a four-element commutator device capable of 16 position operation. A plurality of such devices may be combined to multiply the possible number of positions or units of the code. The manner of combining a plurality of commutators is shown in Figure 5.

Figure 5:
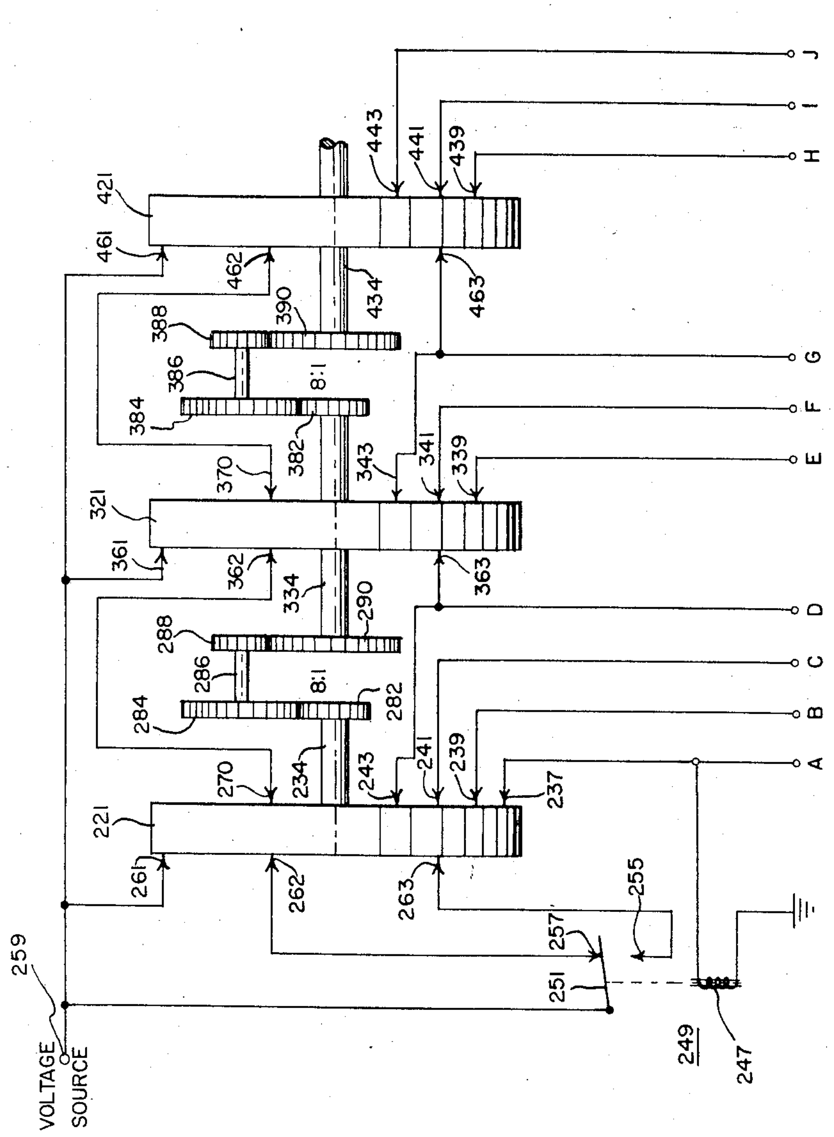
Figure 5 is a view in elevation of a plurality of disc-type commutators combined for multiplying the number of positions of the code.

The system of Figure 5 utilizes the disc type commutators of Figures 3 and 4 and may use as many of them as may be required for the code desired. Two commutators combined in the manner shown will produce a 7 digit code representing 128 equal incremental steps of shaft rotation. Similarly, three commutators can be combined to produce a 10 digit code equal to 1024 incremental steps of shaft rotation. A system utilizing three commutators is shown in Figure 5.

The system of reference characters applied to the system of Figure 5 is keyed to that used in connection with Figures 2, 3 and 4. Commutator 221 of Figure 5 is the same as shown in Figures 3 and 4 and has been designated by the same reference character. Similarly other elements such as brushes 237, 239, 241, and 243 are designated by the same reference characters. The circuit connections are the same as shown in Figure 2, the relay 149 of Figure 2 being designated 249 in Figure 5.

It will be apparent that the rear face of commutator shown in Figure 4, faces to the left-hand side of Figure 5, and the front face of Figure 3 faces toward the right. The connections to source terminal 259 are made to commutator 221 through brush 261 and through relay armature 251 contacts 255 and 257 and brushes 262 and 263 in the same manner as taught in Figure 2. The slip rings upon which brushes 261, 262 and 263 make contact are not visible in Figure 5. Brushes 262 and 263 with their associated slip rings thus provide a take-off means for connecting the voltage source terminal 259 through the relay contacts 255 and 257 to the commutator code segments.

As in the modification of Figure 2 the digital code output is produced on output terminals A, B, C and D as the commutator 221 rotates on its shaft 234.

A second commutator 321 is geared to shaft 234 through gears 282 and 284, jackshaft 286 and gears 288 and 290. The overall gear ratio between shafts 234 and 334 is 8:1. The outer row of commutator segments of the second commutator 321 is not used and the brush bearing upon these segments is therefore omitted. Brushes 339, 341 and 343 bearing upon the remaining rows of commutator segments are connected to output terminals E, F and G respectively. The necessary switching of the input leads to brushes 362 and 363, corresponding to the leads attached to brushes 262 and 263 of commutator 221, is accomplished by the inner row of commutator segments on the commutator 221. This switching utilizes a second or auxiliary brush 270 located at 180° from the main brush 243. It will be apparent the inner or major row of commutator segments consists of two elements and that the brushes 243 and 270 bearing thereon will be alternately energized and deenergized by rotation of the commutator. Due to the fact that the commutator 221 rotates at a speed eight times as great as that of commutator 321, the two segment inner or major commutator ring of commutator 221 becomes the equivalent of the sixteen segment outer or minor ring of commutator 321. The two brushes 243 and 270 located at 180° with respect to one another take over the functions of the normally closed and open contacts 255 and 257 of the relay 249. The same type of switching is therefore accomplished in the leads to the slip ring brushes 362 and 363.

The arrangement as thus far described constitutes a 7 unit binary code system capable of coding 128 shaft positions. Shaft 334 is connected to a third commutator shaft 434 through an 8:1 gear ratio system consisting of gears 382 and 384, jackshaft 386, and gears 388 and 390. A commutator 421 is mounted on the shaft 434. The commutator 421 is of the same type as those previously described and is shown in Figures 3 and 4. The connections between commutator 421 and the commutator 321 are the same as those previously described between commutators 221 and 321. A brush 461 is connected to source terminal 259, a second brush 462 is connected to an auxiliary brush 370 bearing on the inner or major ring of commutator segments on commutator 321. A third brush 463 is connected to a brush 343 also located on the major ring of commutator segments of commutator 321. Brushes 439, 441 and 443 are connected to output terminals H, I and J, respectively. The system including commutator 421 and its connections becomes a 10-unit code system capable of coding 1024 positions of shaft rotation. Further extensions of the system obviously may be made to accommodate any desired number of code units.

The transducer and systems disclosed herein avoid the ambiguity difficulties of the prior art with a minimum of apparatus and make possible a simple system producing positive and accurate coded information. The possibilities of faulty or improper operation are thus avoided.

Obviously many variations of the present invention are possible in the light of the above teachings. It is therefore to be understood that within the scope of the appended claims the invention may be practiced otherwise than as specifically described.

What is claimed is:

1. A digital code transducer comprising a commutating surface having electrically conductive code segments and insulating segments arranged in rows corresponding to digits of information, said code segments being connected to a source of potential, one row of said information segments additionally comprising a control row, a plurality of electrically conductive switching segments placed between said electrically conductive code segments and insulating segments except said segments in said control row, and means for connecting and disconnecting said switching segments to said source of potential controlled by said control row to eliminate ambiguities in said digits of information.

2. A digital code transducer comprising a commutating surface comprising electrically conductive code segments and insulating segments arranged in rows corresponding to digits of information, one row of said information segments additionally comprising a control row, a plurality of electrically conductive switching segments connected to each other in a system of at least two groups, said switching segments being approximately equal to one digit in length with one switching segment placed at the beginning and end of each of said code segments except said segments in said control row, and means for alternately connecting said groups of switching segments to said code segments controlled by said control row to eliminate ambiguities in said digits of information produced at the beginning and end of said code segments.

3. An electromechanical transducer for providing a digital code output representative of a shaft position comprising commutator means having electrically energized and nonenergized segments arranged to produce a digital code, a source of electrical energizing potential connected to said energized segments, a plurality of brush means cooperating with said commutating means for providing the output of said transducer, a plurality of auxiliary conductive segments positioned between the energized and nonenergized segments of the portions of said commutator means which represent the major digits of said code, means connecting said auxiliary segments into two groups, and switching means controlled by the output from the minor digit commutating means for connecting said source of energizing potential to one or the other of said groups of auxiliary segments whereby the condition of energization of the brushes providing the outputs of said major digits is changed only while the brushes are resting on an auxiliary segment.

4. An electromechanical transducer for providing a digital code output representative of the position of a shaft comprising commutator means having electrically energized and nonenergized segments arranged to produce a digital code, a source of electrical energizing potential connected to said energized segments, a plurality of brush means cooperating with said commutator means for providing said output, a plurality of auxiliary conductive segments on said commutator means separating each of the energized and nonenergized segments representing the major digits of said code whereby each of said major digit output brushes will rest on an auxiliary segment at the points where its condition of energization should change, means connecting said auxiliary segments into two groups, and electrical switching means controlled by the minor digit output for connecting said source of energizing potential to one or the other of said groups.

5. A digital code transducer comprising a rotatable shaft, a commutator having an insulating surface mounted on said shaft for rotation therewith, a plurality of electrically conductive code segments mounted on said insulating surface and radially spaced about said shaft axis in accordance with a digital code pattern, one row of said code segments constituting a control row, a plurality of electrically conductive switching segments approximately equal to one digit in length with one switching segment placed at the beginning and end of each of said code segments except said code segments in said control row, a plurality of output brushes with one brush adapted to engage the segments of each of said rows of conductive segments, electrically conducting means connecting said code segments into one group and said switching segments into a plurality of groups, a plurality of slip rings mounted on said shaft, electrical connecting means between each of said groups and a respective one of said slip rings, means adapted to connect a source of potential to the slip ring connected to said group of code segments and means including switch means responsive to said output brush engaging said control row adapted to connect said source of potential selectively to said slip rings connected to said groups of switching segments.

6. The combination according to claim 5 wherein said commutator comprises a drum having said conductive segments mounted on the periphery thereof, and means mounting said slip rings on said drum in spaced, parallel relationship with said conductive segments.

7. The combination according to claim 5 wherein said commutator comprises a disc having said conductive segments mounted on one side and said slip rings mounted on the other side thereof.

8. A digital code transducer comprising a plurality of shafts, gear means interposed between each of said shafts for changing the speed of rotation of each successive shaft in a predetermined ratio, commutating means having an insulating surface mounted on each of said shafts for rotation therewith, a plurality of electrically conductive code segments mounted in rows on said insulating surface of each of said commutating means, one row of said code segments additionally comprising a control row, a plurality of electrically conductive switching segments approximately equal to one digit in length with one switching segment placed at the beginning and end of each of said code segments except said code segments in said control row, output means associated with each of said rows of conductive segments, electrical conducting means on each of said commutating means connecting the code segments into one group and the switching segments into a plurality of groups, a plurality of take-off means on each of said commutating means equal in number to the number of said segment groups, electrical connecting means between each group and a respective one of said take-off means, input means adapted to connect a source of potential to said take-off means connected to said code segments, and means including switch means responsive to energization of said output means connected to said control row adapted to connect said source of potential selectively to said take-off means connected to said groups of switching segments.

9. An electromechanical transducer for providing a digital code output representative of a shaft position comprising commutator means having electrically energized and nonenergized segments arranged to produce a digital code having a minor digit and at least one major digit, brush means cooperating with said commutator means for providing the output of said transducer for each of said digits, auxiliary conductive segments positioned between the energized and nonenergized segments representative of said major digit, and switching means controlled by the output from said minor digit brush means for electrically connecting and disconnecting said auxiliary segments to said energized segments whereby the conditions of energization of the brush providing the output of said major digit is changed simultaneously with the change of condition of energization of the brush providing the output for said minor digit.

References Cited in the file of this patent

UNITED STATES PATENTS

| | | |
|---|---|---|
| 2,318,591 | Couffignal | May 11, 1943 |
| 2,666,912 | Gow et al. | Jan. 19, 1954 |
| 2,747,797 | Beaumont | May 29, 1956 |
| 2,766,445 | Bland | Oct. 9, 1956 |